United States Patent
Yun

(10) Patent No.: US 12,296,800 B2
(45) Date of Patent: May 13, 2025

(54) ELECTRONIC PARKING BRAKE SYSTEM AND CONTROL METHOD THEREOF

(71) Applicant: HL MANDO CORPORATION, Pyeongtaek-si (KR)

(72) Inventor: Yeonghan Yun, Anyang-si (KR)

(73) Assignee: HL MANDO CORPORATION, Pyeongtaek (KR)

( * ) Notice: Subject to any disclaimer, the term of this patent is extended or adjusted under 35 U.S.C. 154(b) by 443 days.

(21) Appl. No.: 17/893,323

(22) Filed: Aug. 23, 2022

(65) Prior Publication Data

US 2023/0075904 A1   Mar. 9, 2023

(30) Foreign Application Priority Data

Sep. 6, 2021   (KR) .................. 10-2021-0118590

(51) Int. Cl.
*B60T 17/22* (2006.01)
*B60T 13/74* (2006.01)

(52) U.S. Cl.
CPC .......... *B60T 17/221* (2013.01); *B60T 13/741* (2013.01); *B60T 2270/406* (2013.01)

(58) Field of Classification Search
CPC ................ B60T 17/221; B60T 13/741; B60T 2270/406; B60T 17/22; B60T 13/662
See application file for complete search history.

(56) References Cited

U.S. PATENT DOCUMENTS

2018/0118177 A1 *  5/2018  No ..................... H02P 7/03

OTHER PUBLICATIONS

William Thomson and Mark Fenger, Current Signature Analysis to Detect Induction Motor Faults, 2001 IEEE, Industry Applications Magazine Jul./Aug. 2001. (Year: 2001).*

* cited by examiner

*Primary Examiner* — Aniss Chad
*Assistant Examiner* — Chase L Cooley
(74) *Attorney, Agent, or Firm* — Harvest IP Law, LLP

(57) ABSTRACT

An electronic parking brake system including: an electronic parking brake including a pair of brake pads disposed on both sides of a brake disc rotating with a rear wheel of a vehicle, a piston provided to press the pair of brake pads, a nut member provided to press the piston, a spindle member provided to move the nut member, and a motor configured to rotate the spindle member; and a controller electrically connected to the motor and configured to perform a parking operation for the EPB, wherein the controller is configured to detect an inrush current flowing through the motor during the parking operation, and identify a low voltage fault based on the detected inrush current.

10 Claims, 6 Drawing Sheets

[FIG. 1]
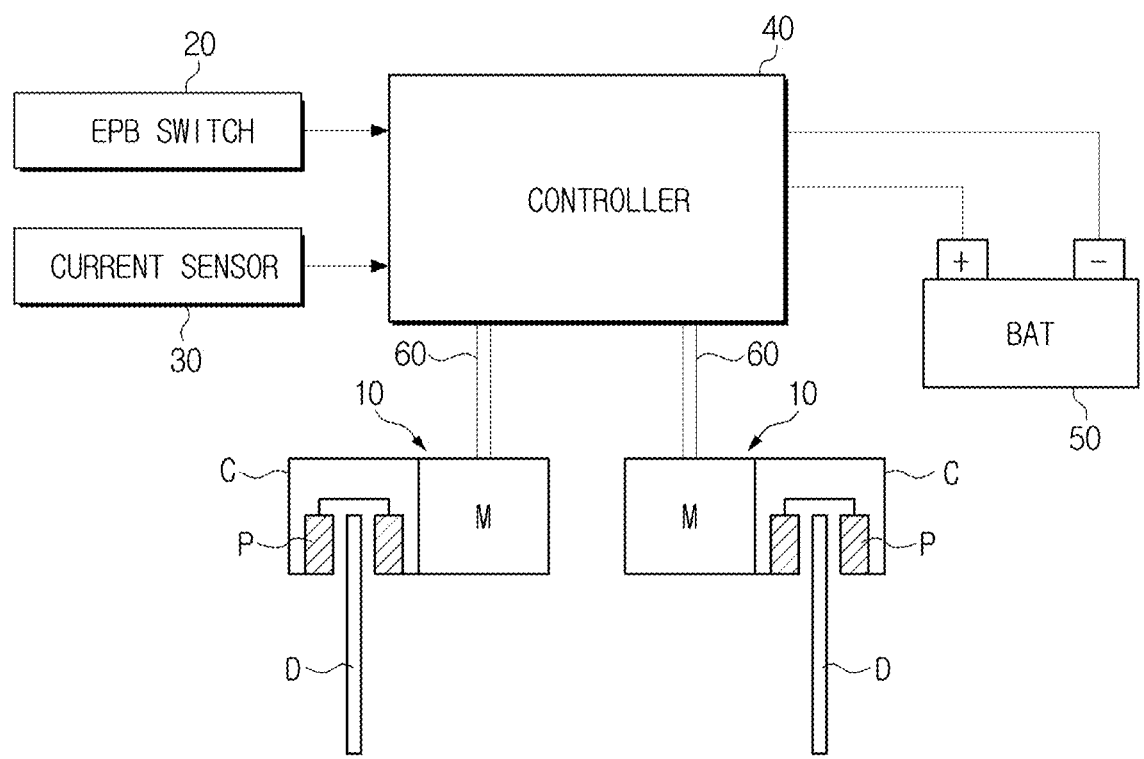

[FIG. 2]
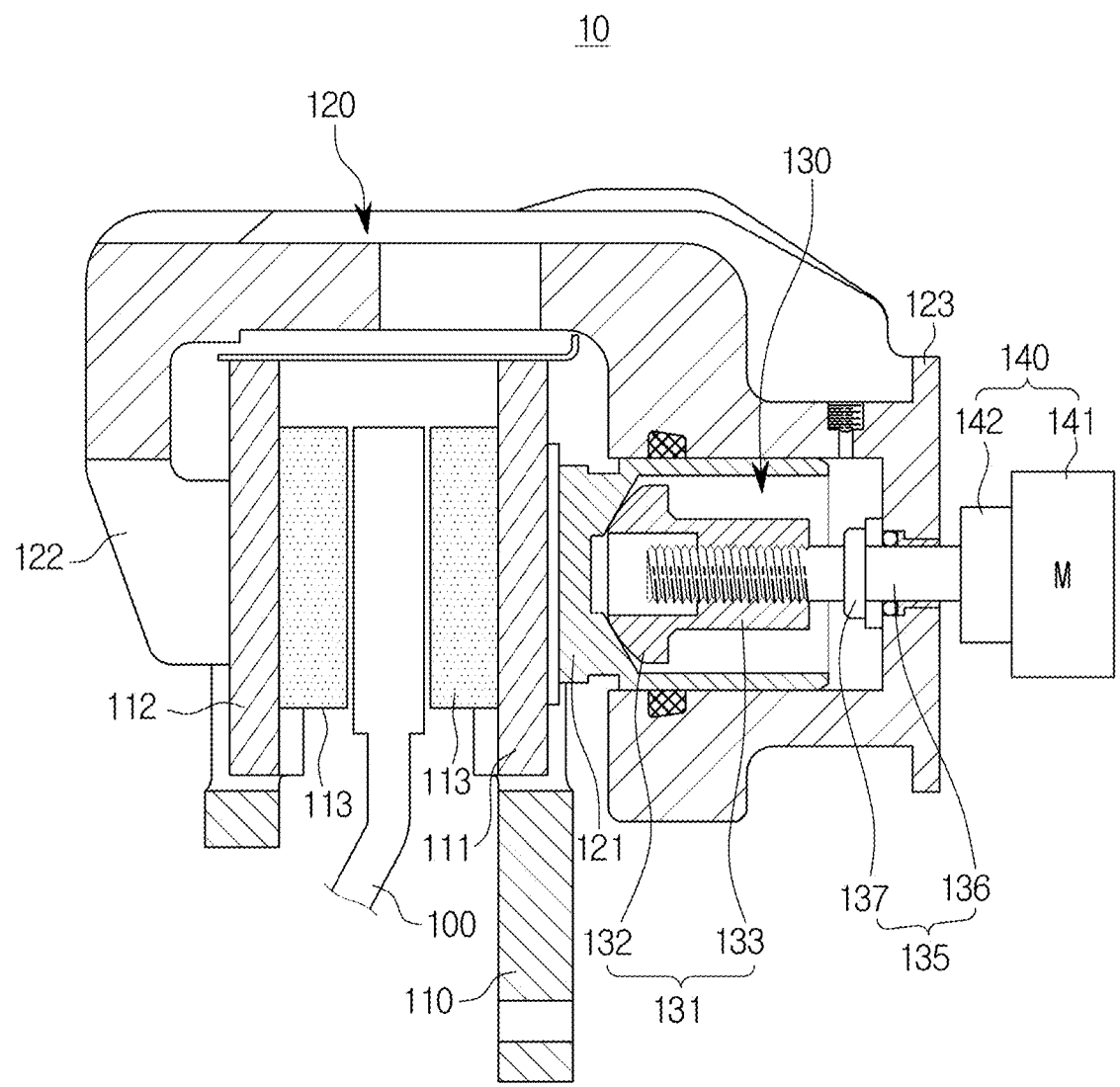

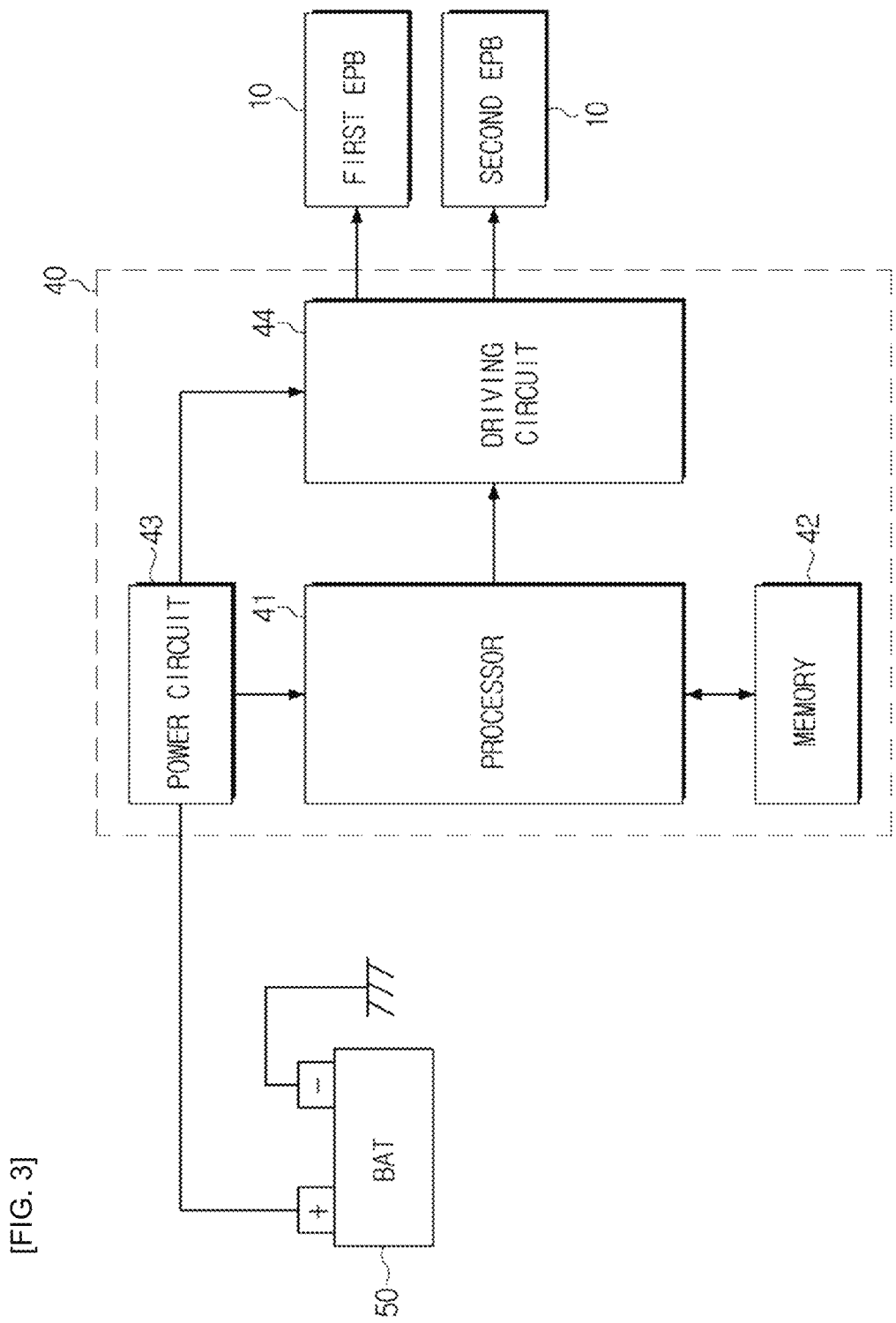
[FIG. 3]

[FIG. 4]
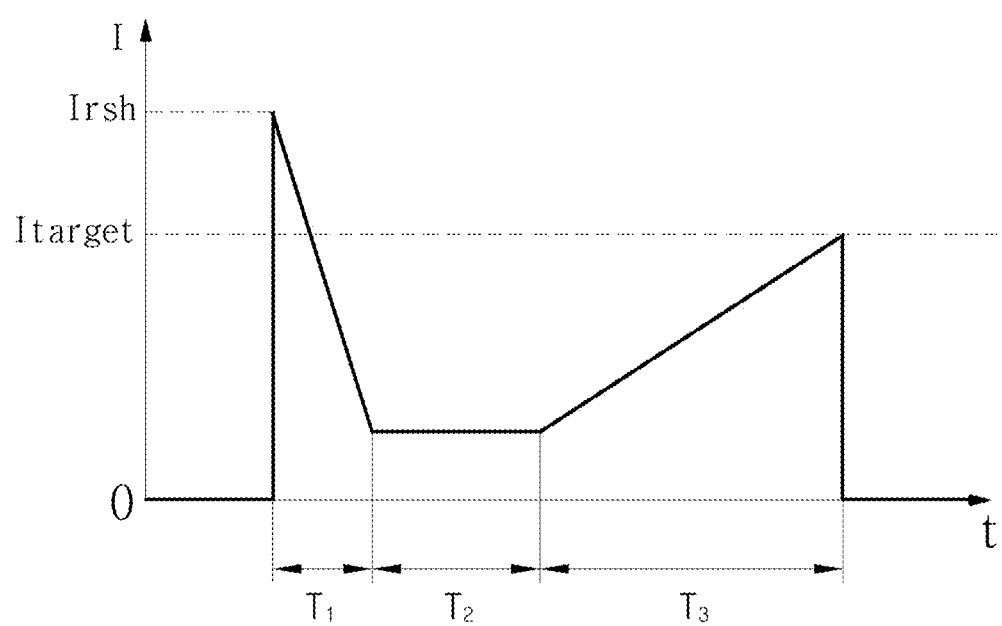

[FIG. 5]
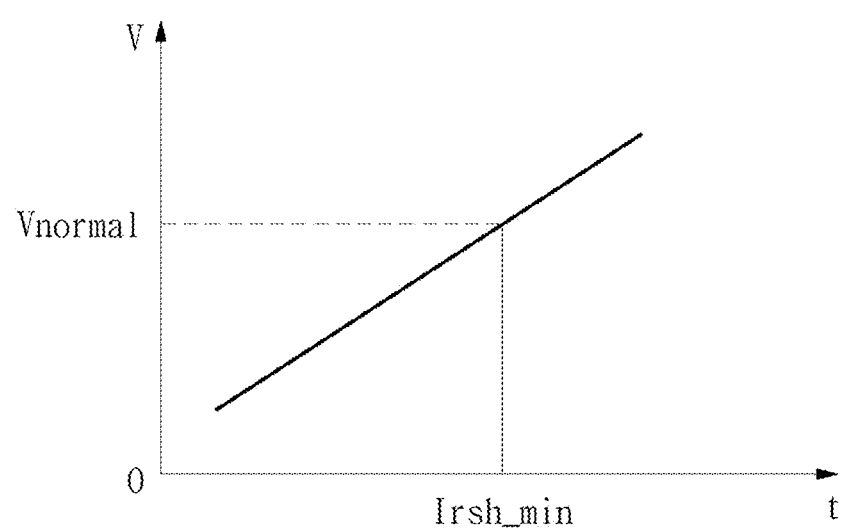

[FIG. 6]
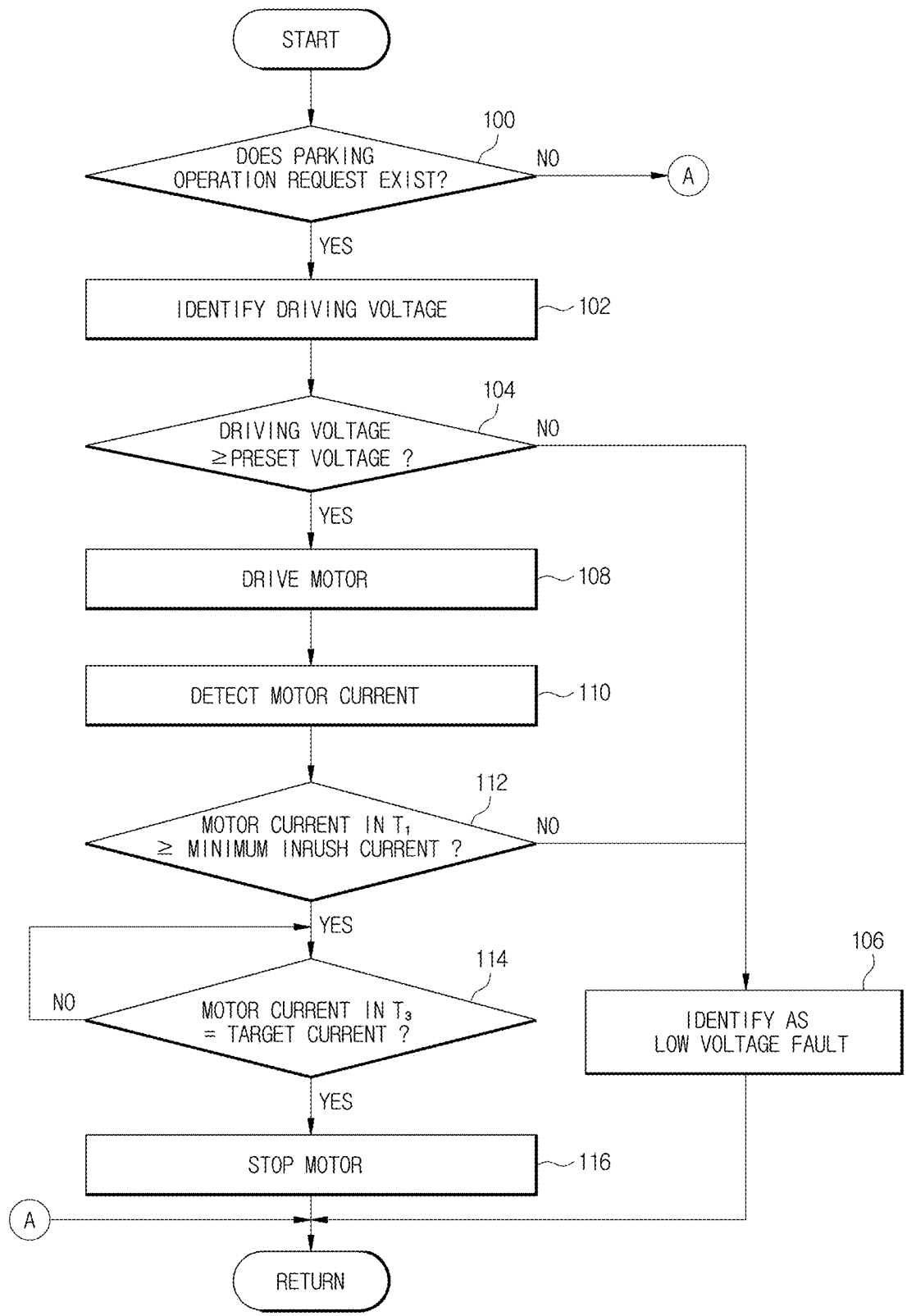

ELECTRONIC PARKING BRAKE SYSTEM AND CONTROL METHOD THEREOF

CROSS-REFERENCE TO RELATED APPLICATION

This application is based on and claims priority under 35 U.S.C. § 119 to Korean Patent Application No. 10-2021-0118590, filed on Sep. 6, 2021 in the Korean Intellectual Property Office, the disclosure of which is incorporated herein by reference.

BACKGROUND

1. Technical Field

The disclosure relates to an electronic parking brake system and a control method thereof.

2. Background Art

In general, an electronic parking brake (EPB) system, in particular, a Motor-on-Caliper (MoC)-type EPB system increases a torque, generated from an electric motor, through a reducer to generate a clamping force required for parking by a mechanical system inside a caliper.

The EPB system presses brake pads onto a disc, which rotates integrally with a vehicle wheel, by operating an EPB actuator mounted on the vehicle wheel, thereby may generate a clamping force by a friction between the brake pads and the disc.

In the EPB system, when parking, an electronic control unit (ECU) drives an electric motor of the EPB actuator, and when a motor current reaches a target current, it is identified that a required clamping force is generated, thereby finishing a parking control.

When a driving voltage supplied to the EPB actuator is lower than a predetermined level during parking, the EPB system identifies it as a low voltage fault.

Conventionally, a voltage difference between a (+) terminal and a (−) terminal of an ECU is estimated as a driving voltage supplied to an EPB actuator.

However, a power supply terminal voltage (or ECU driving voltage) of the ECU may be different from an actual driving voltage of the EPB actuator. For example, when a resistance of a wire harness for electrical connection between the ECU and the EPB actuator unexpectedly and abnormally increases, the power supply terminal voltage of the ECU is a normal voltage, but the driving voltage of the EPB actuator may be a low voltage.

Accordingly, conventionally, even when a driving voltage of the EPB actuator is a low voltage, a low voltage fault is unlikely to be detected.

SUMMARY

An aspect of the disclosure provides an electronic parking brake system and a control method thereof that may detect a low voltage fault of an EPB actuator more accurately and reliably.

Additional aspects of the disclosure will be set forth in part in the description which follows and, in part, will be obvious from the description, or may be learned by practice of the disclosure.

According to an aspect of the disclosure, there is provided an electronic parking brake system, including: an electronic parking brake (EPB) including a pair of brake pads disposed on both sides of a brake disc rotating with a rear wheel of a vehicle, a piston provided to press the pair of brake pads, a nut member provided to press the piston, a spindle member provided to move the nut member, and a motor configured to rotate the spindle member; and a controller electrically connected to the motor and configured to perform a parking operation for the EPB, wherein the controller is configured to detect an inrush current flowing through the motor during the parking operation, and identify a low voltage fault based on the detected inrush current.

The controller is configured to identify the low voltage fault based on the detected inrush current and a driving voltage of the controller.

The controller is configured to identify as the low voltage fault if the driving voltage of the controller is higher than a preset voltage and the detected inrush current is lower than a minimum inrush current.

The controller is configured to identify the minimum inrush current according to the driving voltage of the controller.

The controller is configured to identify the minimum inrush current depending on the driving voltage of the controller, based on driving voltage-minimum inrush current mapping data stored in a memory.

According to an aspect of the disclosure, there is provided a control method of an electronic parking brake system including an EPB including a pair of brake pads disposed on both sides of a brake disc rotating with a rear wheel of a vehicle, a piston provided to press the pair of brake pads, a nut member provided to press the piston, a spindle member provided to move the nut member, and a motor configured to rotate the spindle member; and a controller electrically connected to the motor and configured to perform a parking operation for the EPB, the control method including: detecting an inrush current flowing through the motor during the parking operation; and identifying a low voltage fault based on the detected inrush current.

The identifying of the low voltage fault includes identifying the low voltage fault based on the detected inrush current and a driving voltage of the controller.

The identifying of the low voltage fault includes identifying as the low voltage fault if the driving voltage of the controller is higher than a preset voltage and the detected inrush current is lower than a minimum inrush current.

The identifying of the low voltage fault includes identifying the minimum inrush current according to the driving voltage of the controller.

The identifying of the low voltage fault includes identifying the minimum inrush current depending on the driving voltage of the controller, based on driving voltage-minimum inrush current mapping data stored in a memory.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 illustrates a configuration of an electronic parking brake system according to an embodiment;

FIG. 2 illustrates an electronic parking brake applied to an electronic parking brake system according to an embodiment;

FIG. 3 illustrates a control block of a controller of an electronic parking brake system according to an embodiment;

FIG. 4 illustrates a change in motor current with time during a parking operation of an electronic parking brake system according to an embodiment;

FIG. 5 is a graph illustrating a relationship between a minimum inrush current for identifying a low voltage fault and a driving voltage of a controller of an electronic parking brake system according to an embodiment; and FIG. 6 illustrates a control method of an electronic parking brake system according to an embodiment.

DETAILED DESCRIPTION

Like reference numerals throughout the specification denote like elements. Also, this specification does not describe all the elements according to embodiments of the disclosure, and descriptions well-known in the art to which the disclosure pertains or overlapped portions are omitted. The terms such as "~part", "~member", "~module", "~block", and the like may refer to at least one process processed by at least one hardware or software. According to embodiments, a plurality of "~part", "~member", "~module", "~block" may be embodied as a single element, or a single of "~part", "~member", "~module", "~block" may include a plurality of elements.

It will be understood that when an element is referred to as being "connected" to another element, it can be directly or indirectly connected to the other element, wherein the indirect connection includes "connection" via a wireless communication network.

It will be understood that the term "include" when used in this specification, specifies the presence of stated features, integers, steps, operations, elements, and/or components, but do not preclude the presence or addition of one or more other features, integers, steps, operations, elements, components, and/or groups thereof.

It will be understood that when it is stated in this specification that a member is located "on" another member, not only a member may be in contact with another member, but also still another member may be present between the two members.

It will be understood that, although the terms first, second, etc. may be used herein to describe various elements, these elements should not be limited by these terms. It is to be understood that the singular forms are intended to include the plural forms as well, unless the context clearly dictates otherwise.

Reference numerals used for method steps are just used for convenience of explanation, but not to limit an order of the steps. Thus, unless the context clearly dictates otherwise, the written order may be practiced otherwise.

FIG. 1 illustrates a configuration of an electronic parking brake system according to an embodiment.

Referring to FIG. 1, the electronic parking brake system may include an electronic parking brake (EPB) 10, an EPB switch 20, a current sensor 30 and a controller 40.

The EPB 10 may provide a parking braking force to a brake disc D rotating with each of the left and right rear wheels.

The EPB 10 generates a clamping force for parking with respect to each of the rear wheels. The EPB 10 is controlled by the controller 40.

The EPB 10 is operated by a motor M to generate the clamping force. The EPB 10 generates the clamping force by pressing a brake pad P to the brake disc D in a brake caliper C of each of the left and right rear wheels by driving the motor M.

FIG. 2 illustrates an EPB applied to an electronic parking brake system according to an embodiment.

Referring to FIG. 2, the EPB 10 may include a carrier 110 on which a pair of pad plates 111 and 112 are installed movably in forward and backward directions to press a brake disc 100 that rotates with a wheel of a vehicle, a caliper housing 120 slidably installed on the carrier 110 and including a cylinder 123 in which a piston 121 is movably installed in forward and backward directions by braking hydraulic pressure, a power conversion unit 130 provided to press the piston 121, and a motor actuator 140 provided to deliver a rotational force to the power conversion unit 130 using the motor M.

The pair of pad plates 111 and 112 are divided into an inner pad plate 111 disposed to be in contact with the piston 121 and an outer pad plate 112 disposed to be in contact with a finger part 122 of the caliper housing 120. The pair of pad plates 111 and 112 are installed on the carrier 110 fixed to a vehicle body so that the pair of pad plates 111 and 112 may move toward both sides of the brake disc 100. Also, brake pads 113 are attached to one surface of each of the pair of pad plates 111 and 112 that face the brake disc 100.

The caliper housing 120 is slidably installed on the carrier 110. More specifically, the power conversion unit 130 is installed at a rear of the caliper housing 120, and the caliper housing 120 includes the cylinder 123 in which the piston 121 is movably installed in forward and backward directions and the finger part 122 bent in a lower direction to operate the outer pad plate 112. The finger part 122 and the cylinder 123 are integrally formed.

The piston 121 is provided in a cylindrical shape to have a u-shaped inside like a cup, and slidably inserted inside the cylinder 123. The piston 121 presses the inner pad plate 111 toward the brake disc 100 by an axial force of the power conversion unit 130 that receives the rotational force of the motor actuator 140. Accordingly, when the axial force of the power conversion unit 130 is applied, the piston 121 moves toward the inner pad plate 111, thereby pressing the inner pad plate 111. The caliper housing 120 operates in an opposite direction to the piston 121 by a reaction force, and thus the finger part 122 presses the outer pad plate 112 to the brake disc 100 side. Accordingly, braking may be performed.

The power conversion unit 130 may receive the rotational force form the motor actuator 140 and function to press the piston 121 to the inner pad plate 111 side.

The power conversion unit 130 may include a nut member 131, disposed inside the piston 121 to be in contact with the piston 121, and a spindle member 135 screwed to the nut member 131.

The nut member 131 is disposed inside the piston 121 in a state where rotation thereof is limited, and is screwed to the spindle member 135.

The nut member 131 may include a head portion 132 provided to be in contact with the piston 121, and an engagement portion 133 extending from the head portion 132 and in which a female screw thread is formed on an inner circumferential surface thereof in order to be screwed to the spindle member 135.

The nut member 131 moves forward or backward depending on a rotation direction of the spindle member 135, and may function to press the piston 121 or release the pressure on the piston 121. In this instance, the forward direction may be a movement direction in which the nut member 131 approaches the piston 121. The backward direction may be a movement direction in which the nut member 131 is away from the piston 121. In addition, the forward direction may be a movement direction in which the piston 121 approaches the brake pad 113. The backward direction may be a movement direction in which the piston 121 is away from the brake pad 113.

The spindle member 135 may include a shaft portion 136, which passes through a rear portion of the caliper housing 120 and rotates by receiving the rotational force of the motor actuator 140, and a flange portion 137 radially extending from the shaft portion 136. The shaft portion 136 may have one side which is rotatably installed and passes through a rear side of the cylinder 123, and the other side disposed inside the piston 121. In this instance, the one side of the shaft portion 136 that passes through the rear portion of the cylinder 123 is connected to an output shaft of a reducer 142 to receive the rotational force of the motor actuator 140.

The motor actuator 140 may include a motor 141 and the reducer 142.

The motor 141 moves the nut member 131 forward or backward by rotating the spindle member 135, thereby pressing the piston 121 or releasing the pressure on the piston 121.

The reducer 142 may be provided between an output side of the motor 141 and the spindle member 135.

Through the above configuration, when parking is performed, the EPB 10 may rotate the spindle member 135 in one direction using the motor actuator 140, thereby moving the nut member 131 and pressing the piston 121. The piston 121 pressed by the movement of the nut member 131 presses the inner pad plate 111, and thus the brake pad 113 comes into close contact with the brake disc 100, thereby may perform an engagement operation that generates a clamping force.

Also, when parking is released, the EPB 10 may rotate the spindle member 135 in an opposite direction using the motor actuator 140, thereby moving the nut member 131 pressed by the piston 121 backward. The pressure on the piston 121 may be released by the backward movement of the nut member 131. Due to the release of the pressure on the piston 121, the brake pad 113 may be spaced apart from the brake disc 100, thereby may perform a disengagement operation that releases the clamping force.

Referring again to FIG. 1, the EPB switch 20 is for receiving a driver's operation intention with respect to the EPB 10, and may be provided around a driver's seat of the vehicle.

The EPB switch 20 is turned on or off by a driver.

When the EPB switch 20 is on, a signal corresponding to a parking operation command (engagement command, apply command) is transmitted to the controller 40. When the EPB switch 20 is off, a signal corresponding to a parking release command (disengagement command, release command) is transmitted to the controller 40.

The current sensor 30 may detect a current flowing through the motor M. for example, the current sensor 30 may detect a motor current flowing through the motor M using a shunt resistance or a hall sensor. In addition to the shunt resistance or hall sensor, various methods may be applied to the current sensor 30 for detecting the motor current. The current sensor 30 may transmit detected current information to the controller 40.

The controller 40 may engage or disengage the EPB 10 using an operation signal input from the EPB switch 20 or the current information detected by the current sensor 30.

The controller 40 is supplied with power from a battery 50.

The controller 40 is electrically connected to the motor M by a wire harness 60. The wire harness 60 is an assembly of wires for supplying power to the motor M. The controller 40 supplies the power provided from the battery 50 to the motor M through the wire harness 60.

The controller 40 may supply the power provided from the battery 50 to the motor M of the EPB 10 to drive the motor M, thereby generating a clamping force.

FIG. 3 illustrates a control block of a controller of an electronic parking brake system according to an embodiment.

Referring to FIG. 3, the controller 40 may include a processor 41, a memory 42, a power circuit 43 and a driving circuit 44.

The processor 41 may control overall operations of the electronic parking brake system.

The memory 42 may store a program for processing or control of the processor 41 and various data for operating the electronic parking brake system.

The memory 42 may include a volatile memory such as a static random access memory (S-RAM) and dynamic random access memory (D-RAM), and a non-volatile memory such as a flash memory, a read only memory (ROM), an erasable programmable read only memory (EPROM), and the like.

The power circuit 43 generates a predetermined operating voltage from power provided from the battery 50. The power circuit 43 may generate a driving voltage of the processor 41 or the driving circuit 44. The processor 41 or the driving circuit 44 may be operated according to the driving voltage provided by the power circuit 43.

The driving circuit 44 supplies a current to the motors 141 of first and second EPBs 10 according to a control signal of the processor 141 and controls a direction of the current to rotate the motors M 141 forward or reverse. The rotation of the motor M 141 forward or reverse allows the brake pad 113 to move toward or move away from the brake disc 100, thereby generating or releasing a clamping force. Accordingly, the EPB 10 may be engaged or disengaged.

As described above, conventionally, a voltage difference between a (+) terminal and (−) terminal, which is a driving voltage of the controller 40, is estimated as a driving voltage supplied to the motor M 141. However, when a resistance of the wire harness 60 electrically connecting the controller 40 and the motor M 141 increases unexpectedly and abnormally, even though power supply terminal voltage of the controller (electronic control unit, ECU) 40 is a normal voltage, a driving voltage of the motor M 141 may be a low voltage. As such, conventionally, even when the driving voltage of the motor M 141 is a low voltage, a low voltage fault is unlikely to be detected.

To overcome the above, according to the disclosure, an inrush current, that decreases when the resistance of the wire harness 60 between the controller 40 and the motor M 141 increases during a parking operation, may be used as an indicator to identify a state of the driving voltage of the motor M 141. Accordingly, the low voltage fault of the motor M 141 may be detected more accurately and reliably.

FIG. 4 illustrates a change in motor current with time during a parking operation of an electronic parking brake system according to an embodiment.

Referring to FIG. 4, when parking is performed, the controller 40 rotates the motor 141 by applying power to the motor 141, and then detects a motor current. When the motor current reaches a target current Itarget corresponding to a clamping force required for parking, the controller 40 identifies that a parking operation is complete and ends control.

A parking operation period may be largely divided into an inrush current period T1, a no-load period T2 and a load period T3 according to characteristics of change in current value.

The inrush current period T1 is a period in which an inrush current Irsh is initially increased rapidly. When a current is input to the motor 141, a large amount of current is required instantaneously due to an inertia to remain still, causing an initial drastic increase in current.

The no-load current period T2 is a period in which the brake pad 113 is pushed toward the brake disc 100 while the motor 141 rotates after flowing the inrush current. A no-load state in which a load does not act on the motor 141 until the brake pad 113 comes into contact with the brake disc 100 is formed. In this instance, a current having a constant current value of 0 or more flows through the motor 141 for a predetermined period of time.

The load current period T3 is a period in which a parking braking force is generated until the motor current reaches a target current while the brake pad 113 is in contact with the brake disc 100.

The inrush current reflects a change in driving voltage of the motor 141.

When the driving voltage of the controller 40 is high, the inrush current is high, and when the driving voltage of the controller 40 is low, the inrush current is low.

Even when the driving voltage of the controller 40 is a normal voltage, not a low voltage, the inrush current is affected by a resistance of the wire harness 60 between the controller 40 and the motor 141. When the resistance of the wire harness 60 increases, a current value of the inrush current becomes lower than an expected current value. During parking, the resistance of the wire harness 60 may unexpectedly increase due to various causes. For example, the resistance of the wire harness 60 may increase due to a damage to the wire harness 60 between the controller 40 and the motor 141, a foreign substance caught in a connector, disconnection or short-circuit, and the like.

As such, when the resistance of the wire harness 60 increases, the inrush current decreases. Accordingly, by using the above-described change in inrush current, a decrease in driving voltage of the motor caused by the increase in resistance of the wire harness 60 during parking may be identified. That is, whether the motor 141 is driven under a low voltage condition or a normal voltage condition may be identified based on the inrush current change.

FIG. 5 is a graph illustrating a relationship between a minimum inrush current for identifying a low voltage fault and a driving voltage of a controller of an electronic parking brake system according to an embodiment.

Referring to FIG. 5, a horizontal axis represents a current and a vertical axis represents a voltage.

A minimum inrush current Irsh_min, which is a preset current for identifying a low voltage fault, is set for each normal driving voltage Vnormal of the controller 40 in advance. The minimum inrush current for each normal driving voltage may be mapped so that the minimum inrush current Irsh_min increases as the normal driving voltage Vnormal increases, and the minimum inrush current Irsh_min decreases as the normal driving voltage Vnormal decreases.

FIG. 6 illustrates a control method of an electronic parking brake system according to an embodiment.

Referring to FIG. 6, a control method of the electronic parking brake system according to an embodiment may include identifying whether a parking operation request exists (100), identifying a driving voltage of the controller 40 (102), identifying whether the driving voltage is equal to or greater than a preset voltage (104), identifying it as a low voltage fault, when the driving voltage is less than the preset voltage (106), driving the motor 141 when the driving voltage is equal to or greater than the preset voltage (108), detecting a motor current (110), identifying whether a motor current in the period T1 is equal to or greater than a minimum inrush current (112), identifying whether a motor current in the period T3 reaches a target current, when the motor current in the period T1 is equal to or greater than the minimum inrush current (114), and stopping the motor 141 when the motor current in the period T3 reaches the target current (116).

When a signal corresponding to a parking operation command is input from the EPB switch 20, the controller 40 identifies that the parking operation request exists.

The controller 40 may identify a voltage provided to the processor 41 from the power circuit 43, as the driving voltage.

When the driving voltage is less than the preset voltage, the controller 40 identifies that the driving voltage is a low voltage, i.e., the low voltage fault. When the low voltage fault is identified, a driver may be warned of the low voltage fault through a warning device.

When the driving voltage is equal to or greater than the preset voltage, the controller 40 may drive the motor 141, and then detect the motor current through the current sensor 30.

The controller 40 identifies whether the motor current is less than the minimum inrush current in the inrush current period T1. In this instance, the minimum inrush current may be identified by the driving voltage of the controller 40. Based on driving voltage-minimum inrush current mapping data, a minimum inrush current corresponding to a current driving voltage may be identified. The driving voltage-minimum inrush current mapping data may be stored in the memory 42 of the controller 40 in advance.

Even when the driving voltage of the controller 40 is a normal voltage, not a low voltage, an inrush current is affected by a resistance of the wire harness 60 between the controller 40 and the motor 141. Because the resistance of the wire harness 60 increases due to a damage to the wire harness 60 between the controller 40 and the motor 141, a foreign substance caught in a connector, disconnection or short-circuit, and the like, an inrush current in the inrush current period T1 is lower than the minimum inrush current when the driving voltage of the controller 40 is the normal voltage.

When the motor current in the inrush current period T1 is less than the minimum inrush current, the controller 40 identifies it as the low voltage fault. As such, when the motor current is less than the minimum inrush current, the driving voltage of the motor 141 decreases to a low voltage due to the increase in resistance of the wire harness 60, and thus it may be identified that the low voltage fault occurs. When the low voltage fault occurs, the controller 40 may warn a driver of the low voltage fault through a warning device.

As is apparent from the above, according to the embodiments of the disclosure, the electronic parking brake system and the control method thereof can detect a low voltage fault of an EPB actuator more accurately and reliably.

Meanwhile, the aforementioned controller and/or its constituent components may include at least one processor/microprocessor(s) combined with a computer-readable recording medium storing a computer-readable code/algorithm/software. The processor/microprocessor(s) may execute the computer-readable code/algorithm/software stored in the computer-readable recording medium to perform the above-descried functions, operations, steps, and the like.

The aforementioned controller and/or its constituent components may further include a memory implemented as a non-transitory computer-readable recording medium or transitory computer-readable recording medium. The memory may be controlled by the aforementioned controller and/or its constituent components and configured to store data, transmitted to or received from the aforementioned controller and/or its constituent components, or data processed or to be processed by the aforementioned controller and/or its constituent components.

The disclosed embodiment may be implemented as the computer-readable code/algorithm/software in the computer-readable recording medium. The computer-readable recording medium may be a non-transitory computer-readable recording medium such as a data storage device capable of storing data readable by the processor/microprocessor(s). For example, the computer-readable recording medium may be a hard disk drive (HDD), a solid state drive (SDD), a silicon disk drive (SDD), a read only memory (ROM), a compact disc read only memory (CD-ROM), a magnetic tape, a floppy disk, an optical recording medium, and the like.

What is claimed is:

1. An electronic parking brake system, comprising:
   an electronic parking brake (EPB) comprising a pair of brake pads disposed on both sides of a brake disc rotating with a rear wheel of a vehicle, a piston provided to press the pair of brake pads, a nut member provided to press the piston, a spindle member provided to move the nut member, and a motor configured to rotate the spindle member; and
   a controller electrically connected to the motor and configured to perform a parking operation for the EPB,
   wherein the controller is configured to detect an inrush current flowing through the motor during the parking operation, and identify a low voltage fault based on the detected inrush current.

2. The electronic parking brake system of claim 1, wherein the controller is configured to identify the low voltage fault based on the detected inrush current and a driving voltage of the controller.

3. The electronic parking brake system of claim 2, wherein the controller is configured to identify as the low voltage fault if the driving voltage of the controller is higher than a preset voltage and the detected inrush current is lower than a minimum inrush current.

4. The electronic parking brake system of claim 3, wherein the controller is configured to identify the minimum inrush current according to the driving voltage of the controller.

5. The electronic parking brake system of claim 4, wherein the controller is configured to identify the minimum inrush current depending on the driving voltage of the controller, based on driving voltage-minimum inrush current mapping data stored in a memory.

6. A control method of an electronic parking brake system comprising an EPB comprising a pair of brake pads disposed on both sides of a brake disc rotating with a rear wheel of a vehicle, a piston provided to press the pair of brake pads, a nut member provided to press the piston, a spindle member provided to move the nut member, and a motor configured to rotate the spindle member; and a controller electrically connected to the motor and configured to perform a parking operation for the EPB, the control method comprising:
   detecting an inrush current flowing through the motor during the parking operation; and
   identifying a low voltage fault based on the detected inrush current.

7. The control method of claim 6, wherein the identifying of the low voltage fault comprises identifying the low voltage fault based on the detected inrush current and a driving voltage of the controller.

8. The control method of claim 7, wherein the identifying of the low voltage fault comprises identifying as the low voltage fault if the driving voltage of the controller is higher than a preset voltage and the detected inrush current is lower than a minimum inrush current.

9. The control method of claim 8, wherein the identifying of the low voltage fault comprises identifying the minimum inrush current according to the driving voltage of the controller.

10. The control method of claim 9, wherein the identifying of the low voltage fault comprises identifying the minimum inrush current depending on the driving voltage of the controller, based on driving voltage-minimum inrush current mapping data stored in a memory.

* * * * *